United States Patent
Miyamoto (10) Patent No.: US 9,290,042 B2
(45) Date of Patent: Mar. 22, 2016

(54) SPOKE WHEEL

(75) Inventor: Tomo Miyamoto, Kaga (JP)

(73) Assignee: DAIDO KOGYO CO., LTD., Ishikawa Pref. (JP)

(*) Notice: Subject to any disclaimer, the term of this patent is extended or adjusted under 35 U.S.C. 154(b) by 548 days.

(21) Appl. No.: 13/566,163

(22) Filed: Aug. 3, 2012

(65) Prior Publication Data

US 2013/0038117 A1 Feb. 14, 2013

(30) Foreign Application Priority Data

Aug. 10, 2011 (JP) ................. 2011-174884

(51) Int. Cl.
*B60B 1/02* (2006.01)
*B60B 1/04* (2006.01)
*B60B 21/06* (2006.01)

(52) U.S. Cl.
CPC . *B60B 1/04* (2013.01); *B60B 1/043* (2013.01); *B60B 21/06* (2013.01); *B60B 21/066* (2013.01); *B60B 2900/111* (2013.01); *B60Y 2200/12* (2013.01)

(58) Field of Classification Search
CPC .................................. B60B 1/04; B60B 21/06
USPC .............................. 301/55, 58, 59, 104, 110.5
See application file for complete search history.

(56) References Cited

U.S. PATENT DOCUMENTS

| 5,228,756 A | * | 7/1993 | Krampera ..................... 301/58 |
| 5,882,088 A | * | 3/1999 | Yahata ..................... 301/110.5 |
| 6,425,641 B1 | * | 7/2002 | Herting ..................... 301/58 |
| 2007/0205654 A1 | * | 9/2007 | Denk et al. ............. 301/95.102 |
| 2010/0194183 A1 | * | 8/2010 | Chiang ..................... 301/110.5 |

FOREIGN PATENT DOCUMENTS

| JP | H06143902 | * 5/1994 | ............... B60B 1/04 |
| JP | 3237721 | 10/2001 | |

* cited by examiner

*Primary Examiner* — Jason Bellinger
(74) *Attorney, Agent, or Firm* — Wenderoth, Lind & Ponack, L.L.P.

(57) ABSTRACT

A spoke receiving hole extends through a flange formed on a rim so as to incline by a predetermined angle in a radial direction with respect to a line perpendicular to a wheel center plane. A head of a spoke seats on a seating surface provided on one side surface of the spoke receiving hole in contact at a region I on the side closer to a rim body, and a head straight portion of the spoke contacts with an edge portion K of an opening on the side distant from the rim body to which a hole portion directly opens on the side opposite from the seating surface of the spoke receiving hole.

8 Claims, 7 Drawing Sheets

SPOKE WHEEL

BACKGROUND OF THE INVENTION

1. Field of the Invention

The present invention relates to a spoke wheel for use in a motorcycle and the like. More specifically, the invention relates to a spoke wheel suitably used for a tubeless tire spoke wheel having a rim with a flange that is formed to project in an inner diameter direction. The spoke wheel is assembled by anchoring stopper heads of wire spokes to the flange of the rim and by fastening the spokes by nipples at the hub.

2. Description of the Related Art

A motorcycle wheel is composed of a hub attached to an axle, a rim on which a tire mounts and spokes connecting the hub with the rim in general. While there are a cast wheel in which the rim, spokes and hub are integrally molded by casting and a spoke wheel (or more accurately a wired spoke wheel) in which the rim is connected with the hub by a large number of wired spokes, the present invention relates to the spoke wheel. Because the spoke wheel can absorb impacts by deforming its rim and spokes, in addition to that its weight can be lightened, the spoke wheel is adopted in many motorcycles including cruiser-type and off-road-type motorcycles.

Japanese Patent No. 3237721 discloses a spoke wheel in which an annular flange is formed on an inner periphery of the rim, heads of spokes are stopped and anchored to the flange, and male screw portions of the spokes are fastened to ear portions formed on the hub by nipples. Because the spoke wheel has the rim formed of an aluminum mold material and requires no through hole for anchoring the spokes in a well (drop) portion and others thereof, it becomes easy to make the spoke wheel tubeless and to thin the rim including the well portion, as compared to one which is made tubeless by closing spoke anchoring holes perforated through the well portion by rubber caps. Thus, the spoke wheel is preferable also for lightening a weight of the wheel.

Figure 7A:
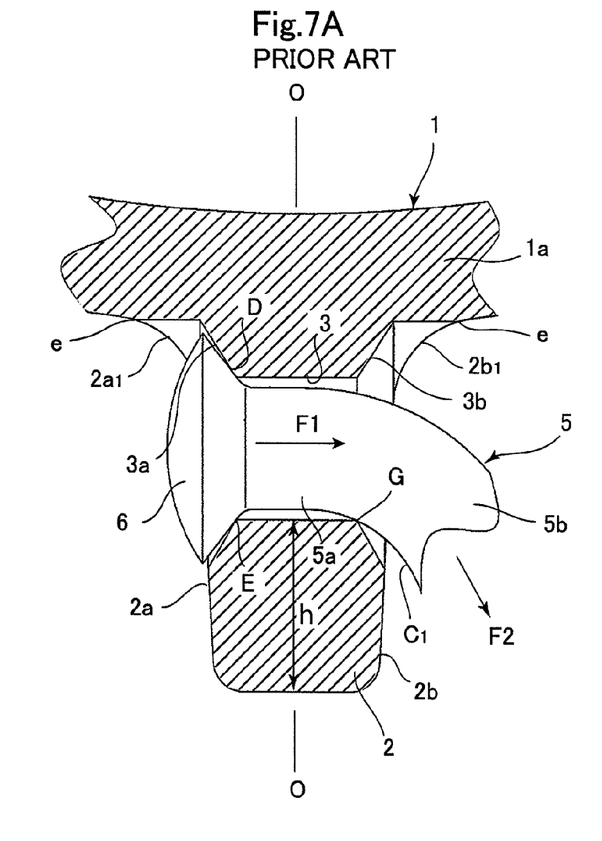
FIG. 7A is a section view of a part of a flange of a prior art rim to which a spoke is anchored and FIG. 7B is an enlarged view showing a part where the spoke contacts with the rim.
Figure 7B:
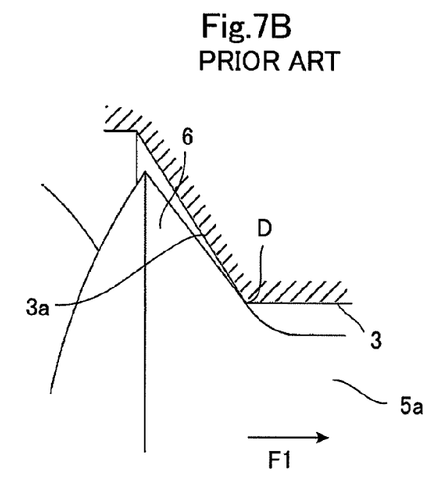

Hitherto, as shown in FIG. 7, the rim 1 with the flange as described above is provided with spoke receiving holes 3 perforated so as to be orthogonal to a center (rotational) plane including a center line O-O of the rim 1. Each spoke receiving hole 3 is provided with tapered surfaces 3a and 3b that open to flange surfaces 2a and 2b on both sides of the spoke receiving hole 3. Each spoke 5 is inserted through the spoke receiving hole 3 from a male screw portion thereof (not shown), and a head 6 thereof is seated and anchored to one tapered surface 3a. Each spoke 5 is bent at a curved portion $C_1$ from the head 6 through a relatively short straight portion 5a or a portion bent with a large radius and extends straightly from the curved portion $C_1$ as a body straight portion 5b. The male screw portion 13d located at an edge of the body straight portion 5b is fastened to the hub by a nipple (not shown) to apply a predetermined tensile force F to the spoke 5.

Therefore, based on the tensile force F1 acting on the head straight portion 5a, the head 6 of the spoke 5 contacts with the flange 2 at a region D close to a rim body 1a and a region E distant from the rim body 1a in an edge part (small diameter part), i.e., a boundary part, of one tapered surface 3a of the spoke receiving hole 3. The spoke 5 also contacts with the flange 2 at a region G distant from the rim body 1a in a small diameter part, i.e., a boundary part, of the other tapered surface 3b of the spoke receiving hole 3 with the curved portion $C_1$.

A compressive force acts on a spoke set of the spoke wheel at part contacting with the ground. Thereby, the spoke wheel receives a force that deforms the rim flat, and tensile forces act on right and left (in a front-back direction of the wheel) spoke sets. Specifically, very large compressive and tensile forces act repetitively on the spokes in the cruiser-type motorcycle whose weight is heavy or in the off-road-type motorcycle to which a large impact load acts after jumping and others. The contact of the spoke 5 with the flange 2 at the contact portion G does not act as a part for locking the spoke 5 and a tensile force F2 from the body straight portion 5b acts directly on the head straight portion 5a as a tensile force F1 and acts on the contact portions D and E of the head 6. Specifically, as shown in FIG. 7, the tensile force F2 from the body straight portion 5b acts as a large force pressing the contact portion D on the side closer to the rim body 1a as a moment on the fulcrum of the contact portion G. Thereby, a large concentration of load occurs in the base portion of the flange 2, causing a fatigue breakdown of the rim 1 and the spoke 5.

Strength of the flange is considered to be dependent on stress received from the spoke receiving hole 3. Hence, the thicker the thickness h of the flange on the inner diameter side of the spoke receiving hole 3, the higher the strength is. Therefore, the spoke receiving hole 3 is made on the side closer to the rim body 1a of the flange 2. In this case, the tapered surfaces 3a and 3b are formed so as to bite from starting-end portions e of curved surfaces $2a_1$ and $2b_1$ from the rim body 1a of the flange 2. Such tapered surfaces 3a and 3b act as a notch effect of the base portions of the flange 2 to the large concentrated load from the contact portion D and are presumed to be a large because of the drop in the fatigue strength.

While a predetermined angle is required for the bending angle of the curved portion $C_1$ of the spoke 5 in order to assure a plane angle (see α in FIG. 1) and an elevation angle (see β in FIG. 2) in tensioning the spokes, the bending angle of the curved portion becomes relatively small (formed in an acute angle direction) because the spoke receiving hole 3 is formed perpendicularly to the center plane O-O of the rim 1 in the spoke wheel described above. The more acute the curved portion of the spoke, the greater the local deformation of the curved portion becomes when a load greater than a certain degree is applied, so that the spoke is liable to be elongated and drops the tension thereof (the spoke is loosened). Still more, the compressive force (a force in a direction of thrusting up the spoke) repetitively acting on the spoke 5 is not caught at the contact portion G and is propagated to the contact portion D (E) of the head 6. The spoke 5 becomes liable to be loosened when a compressive force exceeding the tensile force applied to the spoke acts on the spoke wheel and if the spoke 5 is loosened due to the elongation of the spoke described above and to the compressive force directly propagated to the contact portion D, a wheel balance of the spoke wheel keeping a circular shape by balanced tensile forces of the respective spokes collapses due to the loosened partial spokes. Then, the spoke wheel ends up causing vertical and horizontal vibrations and losing normal functions as a spoke wheel.

While the prior art spoke wheel is arranged to disperse the concentrated load otherwise applied from the spokes to the flange and to prevent the spokes from being loosened by increasing a diameter of the spokes or by increasing a number spoke sets, this measure causes an increase in weight of the spoke wheel, increases unspring weight and wheel inertia (effective inertia) and leads to a drop of running stability.

Still more, the hub described in Japanese Patent No. 3237721 is arranged so as to connect right and left axle supporting sections by a cylindrical section having the same diameter with the supporting sections, and ear portions for fastening spokes are formed respectively radially on an outer diameter side of the right and left axle supporting portions.

That is, this hub requires the separate spoke connecting sections respectively composed of rise portions extending in the radial direction and the flanges extending from the rise portions in the axial direction. This arrangement is disadvantageous in terms of strength and causes an increase in weight. This is one cause of the increase in weight of the spoke wheel and leads to a drop of performances as a spoke wheel as described above.

SUMMARY OF THE INVENTION

The present invention provides a spoke wheel that solves the aforementioned prior art problems by being arranged so as to be able to lock spoke to spoke receiving holes perforated through a flange of a rim.

According to an aspect of the invention, a spoke wheel includes a hub, a rim having a flange formed to project in an inner diameter side of the rim, the flange having first and second side surfaces and being provided with a spoke receiving hole perforated through the flange from the first to second side surfaces with a seating surface provided on the first side surface and a spoke connecting the hub with the rim. The spoke includes: a spoke-head formed at a first end of the spoke and stopped and locked to the spoke receiving hole of the flange, a male screw portion formed at a second end of the spoke and fastened to the hub by a nipple, a curved portion providing the spoke with a predetermined plane angle and an elevation angle with respect to the rim, a head straight portion extending from the spoke-head to the curved portion, and a body straight portion extending straightly from the curved portion to the male screw portion. The spoke receiving hole is perforated through the flange with an inclination of a predetermined angle in a radial direction with respect to a line perpendicular to an imaginary center plane of the rim. The seating surface opens to the first side surface of the flange on a side closer to a rim body due to the inclination with a diameter larger than a hole portion of the spoke receiving hole, and the spoke-head is seated on the seating surface in contact at a region on the side closer to the rim body. The head straight portion penetrating through the hole portion contacts an edge portion on a side distant from the rim body at an opening to which the hole portion opens on the second side surface of the flange.

It is noted that the head straight portion of the spoke is not strictly limited to being straight, and may include a circular arc having a large radius or a curved line whose radius of curvature changes toward the curved portion. That is, this means a part whose shape is close to a straight line with respect to the curved portion.

Further features of the present invention will become apparent from the following description of exemplary embodiments with reference to the following attached drawings. The accompanying drawings, which are incorporated in and constitute a part of the specification, illustrate exemplary embodiments, features, and aspects of the invention and, together with the description, serve to explain the principles of the invention.

BRIEF DESCRIPTION OF DRAWINGS

FIGS. 4A through 4C illustrate a hub to which the invention is applied, wherein

DESCRIPTION OF THE EMBODIMENTS

Figure 1:
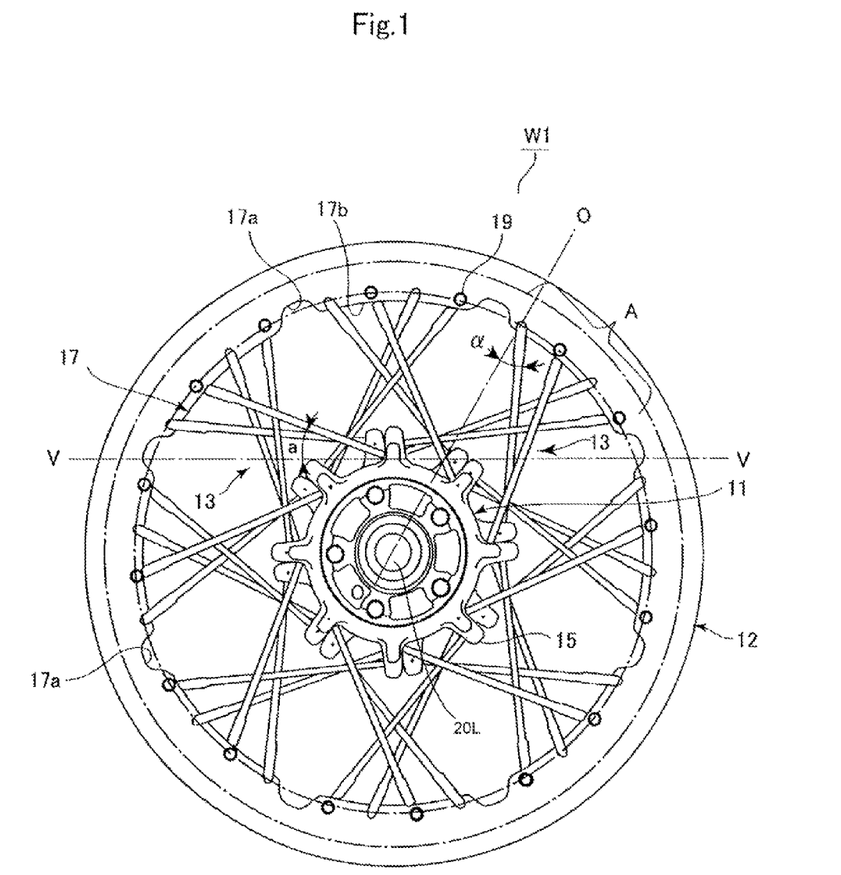
FIG. 1 is a front view of a spoke wheel to which the invention is applied.
Figure 2:
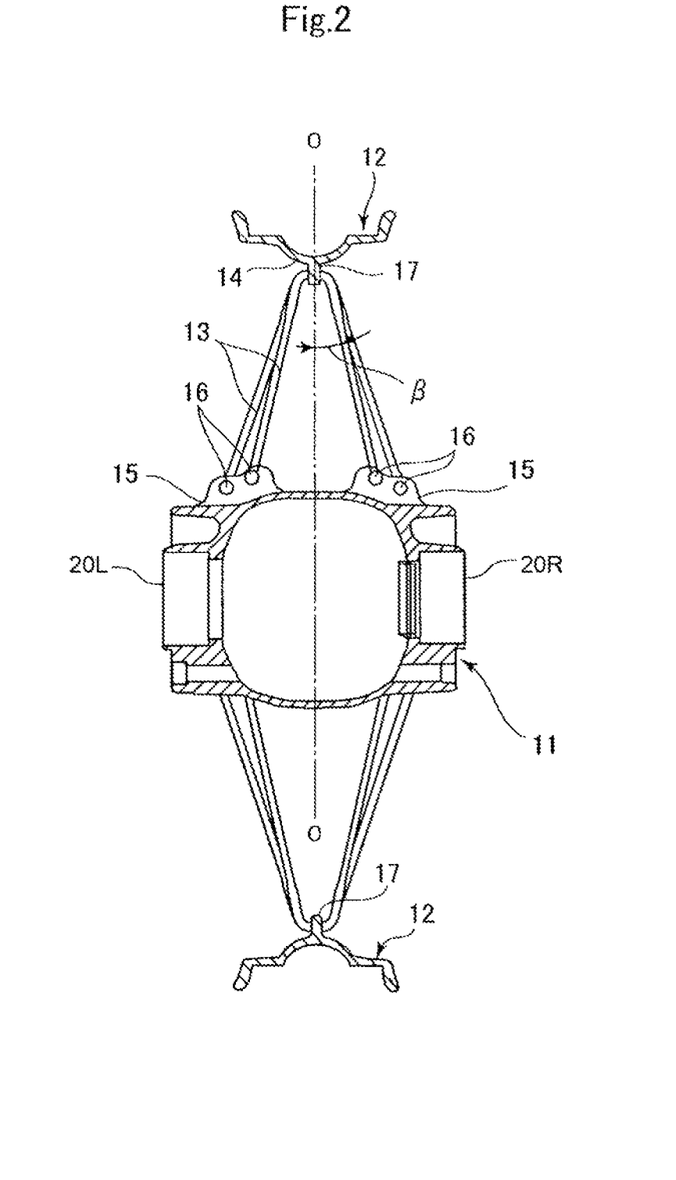
FIG. 2 is a side section view of the spoke wheel shown in FIG. 1.

Embodiments of the present invention will be explained below with reference to the drawings. As shown in FIGS. 1 and 2, a spoke wheel W1 includes a hub 11 through which an axle can be attached, a rim 12 on which a tire can be mounted, and a large number of wire spokes 13 that connect the hub 11 with the rim 12. The hub 11 has a large number of ear portions 15 formed to project at predetermined intervals in a circumferential direction thereof. The ear portions 15 are formed in two rows so that they do not overlap with each other when seen from the front side by leaving predetermined intervals in an axial direction. Each ear portion 15 is provided with two nipple receiving holes 16 respectively formed by leaving a predetermined distance in the axial direction (see FIG. 2). The spokes 13 extend from the two nipple receiving holes 16 respectively in forward and backward directions of the ear portion 15. Ends of the spokes 13 are anchored to the rim 12 with an inclination of a predetermined angle a with respect to a tangential line V-V of the hub (see FIG. 1). The respective spokes 13 are assembled so that four neighboring spokes intersect with each other as one set of a spoke group A. The spoke wheel W1 shown in FIG. 1 is composed of eight sets of spoke groups. Each spoke 13 extends with inclinations of a plane angle $\alpha$ shown in FIG. 1 and an elevation angle $\beta$ shown in FIG. 2 with respect to a center line of the spoke wheel W1 (wheel center line) O-O. It is noted that while an angle taken in a front view is called the plane angle $\alpha$ and an angle taken in a side section view is called the elevation angle $\beta$ as described above, the plane and elevation angles thus referred are technological terms commonly used in the field of spoke wheels.

The rim 12 is provided with a flange 17 so as to project from a widthwise center part (well portion) 14 of the rim 12 around the entire circumferential direction of the inner diameter side of the rim 12. The flange 17 has eight hooking flange portions 17*b* annularly formed by eight cutaway portions 17*a* disposed at predetermined intervals in the circumferential direction. Each hooking flange portion 17*b* has four spoke receiving holes 19 formed per predetermined interval in the circumferential direction. The spokes 13 of one set of spoke group A are hooked respectively one by one to the four spoke receiving holes 19. Thus, the 32 spokes in total are provided tensionally between the hub 11 and the rim 12.

Figures 3A, 3B:
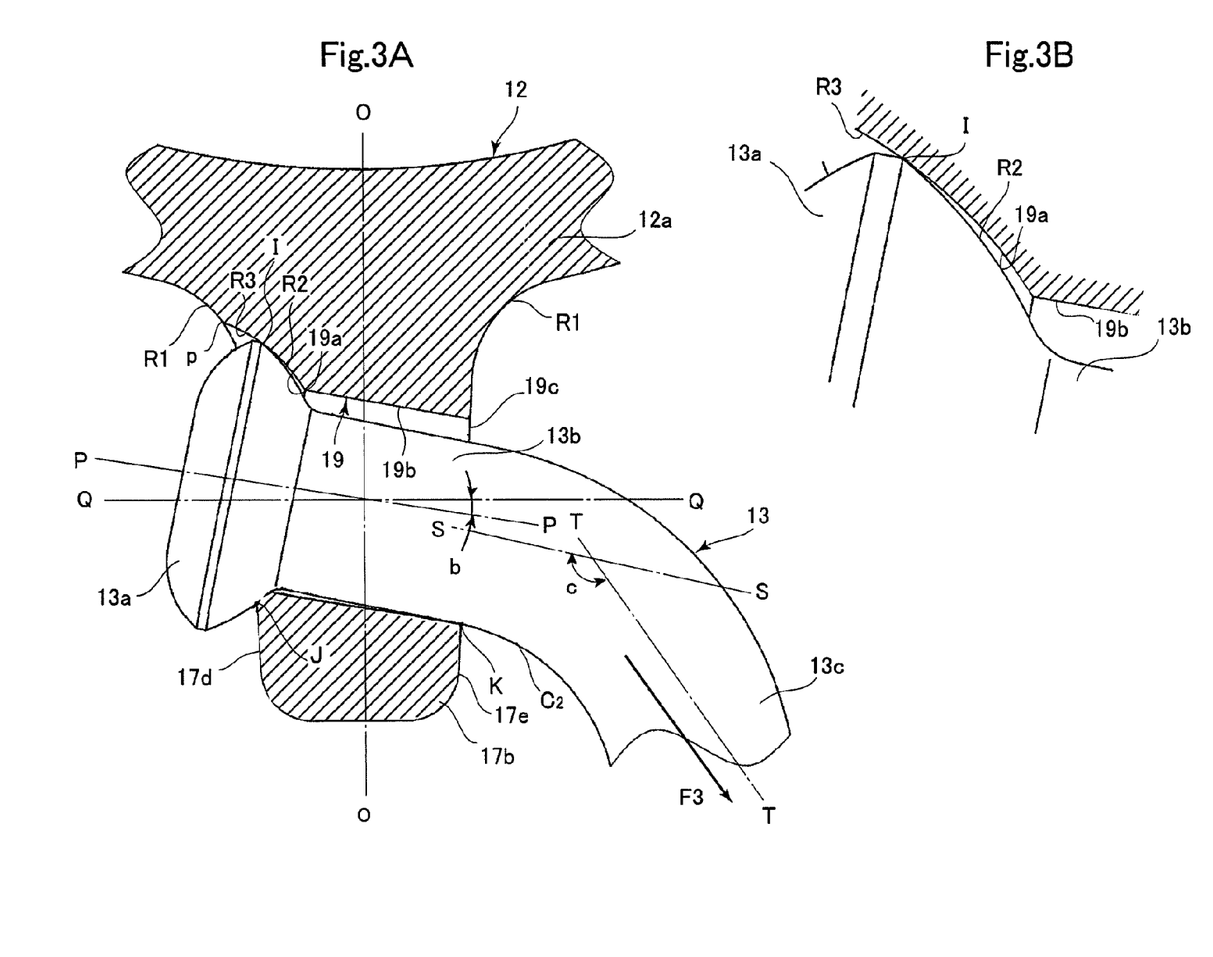
FIG. 3A is a section view of a part of a flange of a rim to which a spoke is anchored and to which the invention is applied and FIG. 3B is an enlarged view of a part of FIG. 3A where the spoke contacts with the rim.

As shown in FIG. 3A, the flange 17 (the hooking flange 17*b*) of the rim. 12 projects from a rim body 12*a* toward the inner diameter side on the outer diameter side through a rising curved surface R1 (first curved surface). The hooking flange 17b is provided with the spoke receiving hole 19 (having a center line P-P) formed so as to incline radially by a predetermined angle b° with respect to a line Q-Q that is perpendicular to a plane O-O including the center line of the rim. 12 (wheel center plane) and so as to penetrate through flange surfaces 17d and 17e on both sides of the flange 17. The spoke receiving hole 19 includes a seating surface 19a having a curved surface R3 (third curved surface). The seating surface 19a is configured to be larger in diameter than a hole portion 19b, and opens on the flange surface 17d with an opening extending towards the rim body 12a due to the inclination of the predetermined angle b of the hole portion 19b. A rim body side end p of the seating surface 19a is formed so as to open at a half-way portion of the rising curved surface R1. That is, because the rim body side end p of the seating surface 19a of the spoke receiving hole 19 opens from the half-way portion of the rising curved surface R1 on the first flange surface 17d side by leaving a part of the curved surface R1, and the spoke receiving hole 19 is inclined by the predetermined angle b radially with respect to the line Q-Q perpendicular to the wheel center plane O-O. The seating surface 19a formed along the inclination has the curved surface R3 which is wider, in terms of an area (diameter), on the section of spoke receiving hole 19 closest to the rim body 12a and a curved surface which is narrower on the side distant from the rim body 12a. No seating surface is formed on the side of the second flange surface 17e, i.e., the other side of the spoke receiving hole 19, and an opening 19c to which the hole portion 19b directly opens is formed. It is noted that the predetermined angle b of the spoke receiving hole 19 is set to be between 5° to 30°.

The spoke 13 has a stopper head 13a formed at one end (first end) thereof, a relatively short head straight portion 13b (having a center line S-S) extending from the head 13a to a curved portion $C_2$, the curved portion $C_2$ where the spoke 13 is curved, a body straight portion 13c (having a center line T-T) extending straightly from the curved portion $C_2$ to a male screw portion 13d and the male screw portion 13d formed at another end (second end) of the spoke 13 and screwed with a nipple. The curved portion $C_2$ provides the spoke 13 with a predetermined plane angle α and an elevation angle β with respect to the rim 12. It is noted that the head straight portion 13b is not limited to being strictly straight, and includes configurations substantially close to a straight line (approximate straight line) with respect to the curved portion $C_2$ such as a circular arc having a large radius and a curve whose curvature of radius gradually increases toward the curved portion $C_2$. A bending angle c at the curved portion $C_2$ of the spoke 13 (an angle formed between the center line S-S of the head straight portion 13b and the center line T-T of the body straight portion 13c described above) is set to be larger (closer to 180°) than the bending angle of the prior art spoke 5 shown in FIG. 7 because the spoke receiving hole 19 into which the spoke 13 is to be fitted is inclined by the predetermined angle b. That is, while the bending angle c is set at the predetermined angle based on the plane angle α and the elevation angle β described above, the bending angle of the spoke 13 is set to be larger than the bending angle of the prior art spoke 5 bent corresponding to the spoke receiving hole 3 formed along the line orthogonal to the wheel center plane O-O by the angle corresponding to the spoke receiving hole 19 inclined by the predetermined angle b. Then, the spoke 13 is inserted through the spoke receiving hole 19 from the seating surface 19a side. The head 13a seats on a region I of the seating surface 19a of the spoke receiving hole 19 on the side of hole 19 closer to the rim body 12a and on a region J on the side distant from the rim body 12a. The head straight portion 13b close to the curved portion $C_2$ also contacts with the spoke receiving hole 19 at an edge portion (small diameter portion) on the side distant from the rim body 12a in an opening 19c in which the hole portion 19b directly opens to the second flange surface 17e on the side opposite from the seating surface 19a of the spoke receiving hole 19.

A part of the head 13a on the head straight portion 13b side is formed of a curved surface R2 (second curved surface). A curve radial dimension of the curved surface R2 is configured to be greater than a radial dimension of the curved surface R3 of the seating surface 19a (R3<R2), so that a contact area of the head 13a with the seating surface 19a increases and the head curved surface R2 contacts with the curved surface R3 of the seating surface 19a on the edge side thereof.

Figure 4A:
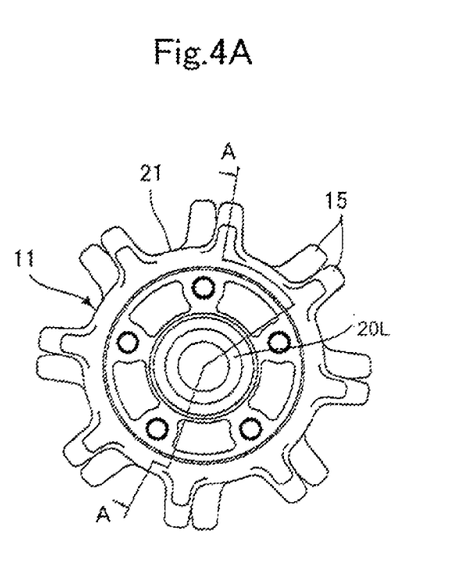
FIG. 4A is a front view thereof.
Figure 4B:
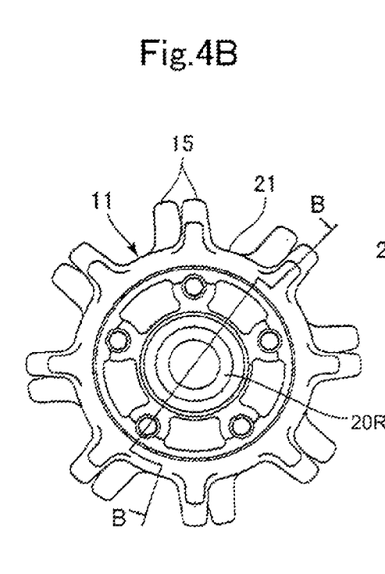
FIG. 4B is a back view thereof.
Figure 4C:
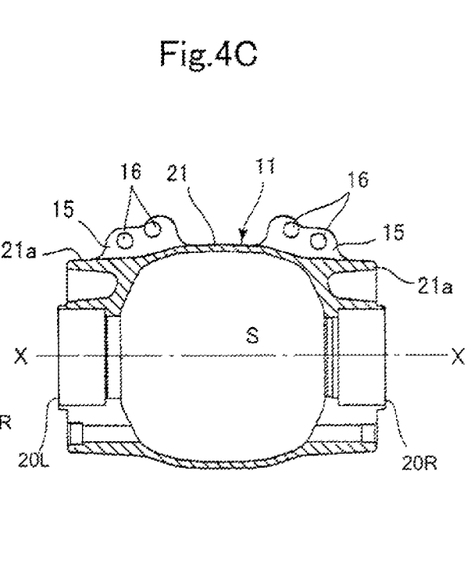
FIG. 4C is a side section view in which a section view taken in a direction of arrows A-A in FIG. 4A is merged with a section view taken in a direction of arrows B-B in FIG. 4B at a widthwise center of the hub.

As shown in FIGS. 4A-4C, the hub 11 is formed into a shape of a drum as a whole by connecting left and right axle supporting portions 20L and 20R spaced apart from each other by a predetermined distance in the axial direction by an outer cylindrical portion 21 whose center part is bulging in the radial direction. The left and right axle supporting portions 20L and 20R are attached with bearings, respectively, and rotatably support a front axle or a rear axle. The outer cylindrical portion 21 that connects outer diameter sides of the left and right axle supporting portions 20L and 20R has annular flanges 21a that extend in the horizontal direction and a plurality of left and right ear portions 15 formed respectively on an outer peripheral surface of the left and right flanges 21a. These left and right ear portions 15 are formed so that a center side thereof bulges in the outer diameter direction corresponding to the outer cylindrical portion 21 whose center side bulges in the outer diameter direction. Each ear portion 15 is provided with two nipple receiving holes 16, respectively. These two nipple receiving holes 16 are disposed so that a first one located widthwise on the inner side is disposed at a position offset radially toward the outside with respect to the second one on the outer side. An inside of the outer cylindrical portion 21 between the left and right axle supporting portions 20L and 20R is a hollow space S approximated by a circular shape in section at a plane containing the axial line X-X.

Figure 5A:
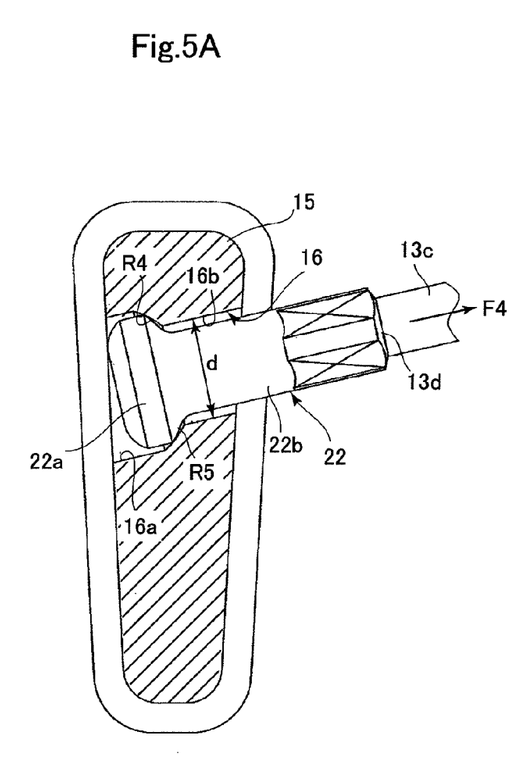
FIG. 5A is a section view of an ear portion of the hub to which a nipple is anchored and to which the invention is applied.
Figure 5B:
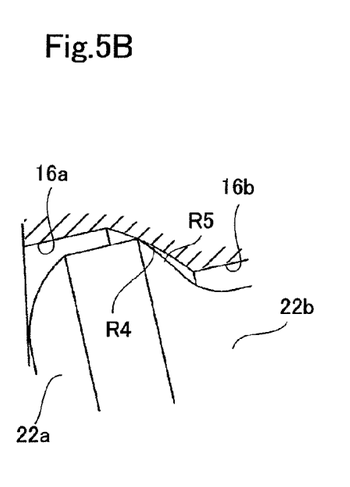
FIG. 5B is an enlarged view of a part of FIG. 5A where the nipple contacts the ear portion.

As shown in FIGS. 5A and 5B, each nipple receiving hole 16 extending through the ear portion 15 is set at an angle that permits receipt of the body straight portion 13c straightly based on the plane angle α and the elevation angle β of the spoke 13, and has a hole portion 16b having a diameter d larger than a body 22b of a nipple 22 and a large stepped portion 16a that opens to one side surface of the ear portion 15 of the hole portion 16b and receives a head 22a of the nipple 22. The large stepped portion 16a has a large diameter hole opening to one side surface of the ear portion 15 and a stepped portion having a tapered curved surface R4 (fourth curved surface) between the large diameter hole and the hole portion 16b.

The nipple 22 has the stopper nipple head 22a formed at one end thereof and the body portion 22b whose diameter is smaller than the nipple head 22a and which extends toward another end through a tapered curved surface R5 (fifth curved surface) of the nipple head 22a. The nipple 22 is inserted from the large stepped portion 16a side of the nipple receiving hole 16 and the curved surface R5 of the nipple head 22a contacts and seats on the curved surface R4 of the stepped portion described above. A radial dimension of the curved surface R5 of the nipple head 22a is set to be greater than a radial dimension of the curved surface R4 of the stepped portion (R4<R5) so that a contact area of the nipple head 22a with the curved surface R4 of the stepped portion increases. Still more, the diameter d of the hole portion 16b of the nipple receiving hole 16 is set to be greater than a diameter of the body portion 22b of the nipple 22, and the base portion of the nipple head 22a is maximized to a size not contacting an edge portion with the stepped portion of the hole portion 16b regardless of the differences of the positions of the two nipple receiving holes 16 of each ear portion 15 so that the nipple 22 and the body straight portion 13c of the spoke generate no bending moment.

The present embodiment is configured as described above. That is, the spoke 13 contacts the spoke receiving hole 19 at the regions I, J and the edge portion K (referred to as contact portions I, J and K hereinafter) on the side of the flange 17 of the rim 12 and is fastened by the nipple 22 on the side of the hub 11 to be applied with a predetermined tensile force F. While the spoke-head 13a contacts the contact portions I and J of the seating surface 19a of the spoke receiving hole 19 by the tensile force F3 applied to the spoke 13 as shown in FIG. 3, the head straight portion 13b generates a rotation moment centering on the contact portion K because the head straight portion 13b contacts the edge portion (small diameter portion) K. Thereby, the contact portion I on the side closer to the rim body 12a of the seating surface 19a receives the most of the tensile force acting on the spoke-head 13a and almost no tensile force acts on the contact portion J on the side distant from the rim body 12a. Rather, due to the moment centering on the contact portion K, the tensile force acts as a compressive force between the contact portions J and K in particular on the side distant from the rim body 12a of the head straight portion 13b of the spoke. Thereby, the force acting from the spoke 13 to the flange 17 of the rim 12, or the force acting as the moment in particular, can be reduced remarkably.

Still more, based on the moment acting on the head straight portion 13b, the spoke 13 is locked to the flange 17 at the contact portion K of the spoke receiving hole 19 by a contact pressure at the contact portion I between the seating surface 19a and the spoke-head 13a and a contact pressure at the contact portion K between the head straight portion 13b and the edge of the spoke receiving hole 19. That is, the force of thrusting up from the spoke 13 is caught by the edge portion K to which the hole portion 19b directly opens and the spoke-head 13a which contacts with the contact portion I is prevented from rising up, so that it is possible to prevent the spokes from being loosened by changes of the tensile force repeatedly acting on the spokes 13 as the spoke wheel W1 rotates.

The stress acting on the contact portion I can be dispersed by configuring the spoke wheel so that the spoke-head 13a contacts surface-to-surface with the seating surface 19a to increase their contact area by adequately configuring the radial dimensions of their curved surfaces (R3<R2), and so that the spoke-head 13a contacts the seating surface 19a at the edge side of the curved surface R2. The contact portion I is located on the side closer to the half-way portion of the seating surface 19a formed from the half-way portion (the rim body side end of the seating surface 19a) of the rising curved surface R1 of the flange 17, i.e., located at a part where strength of the flange 17 is high due to the rising curved surface R1 whose radius is large. Accordingly, even if a large compressive force acts on the contact portion I from the spoke-head 13a, the flange 17 can maintain high fatigue strength together with the dispersion of the stress by the curved surfaces R2 and R3 and the contact at the edge portion described above.

The spoke receiving hole 19 is inclined by the predetermined angle b with respect to the line Q-Q perpendicular to the wheel center plane O-O. Due to that configuration, the bending angle c at the curved portion $C_2$ of the spoke 13 is enlarged, so that the curved portion $C_2$ is widened and deformation in the direction in which the spoke 13 extends can be reduced, i.e., the force acting in the bending direction (the direction in which the spoke extends) is reduced when the spoke is close to straight.

As shown in FIGS. 5A and 5B, the tensile force F4 acting on the nipple 22 from the spoke 13 in the hub 11 acts on the curved surface R4 of the large stepped portion 16a of the nipple receiving hole 16 through the curved surface R5 of the nipple head 22a. The nipple head 22a and the large stepped portion 16a disperse a working stress by increasing a contact area by adequately setting the radial dimensions of the curved surfaces (R4<R5). Still more, even if directions in which the spokes 13 extend are slightly different due to the difference of the positions of the two nipple receiving holes 16 of each ear portion 15, the difference is absorbed by this setting. Furthermore, because the base portion of the nipple head 22a does not contact with the edge portion of the hole portion 16b of the nipple receiving hole 16, each spoke 13 generates no bending moment. Still more, because the ear portions 15 each having the nipple receiving holes 16 of the hub 11 are formed on the outer cylindrical portion 21 having a large diameter and connecting the both axle supporting portions 20L and 20R on the outer radial sides thereof, the ear portions 15 can receive the force from the spokes by dispersing the force in a manner of an arch. Further, because the inside of the outer cylindrical portion 21 between both axle supporting portions 20L and 20R is composed of the space S approximated by a circular shape in section, it is possible to lighten the weight and to enhance the strength of the hub 11.

The spoke wheel W1 receives a force that tries to deform the rim 12 flat by receiving an impact load when a motorcycle having a heavy weight such as a cruiser-type motorcycle travels on an irregular road surface or when a motocross-type motorcycle lands after jumping for example. In such cases, because the cutaway portions 17a are formed around the flange 17 formed across the whole circumference of the inner diameter side of the rim 12, the spoke wheel W1 maintains a high fatigue strength and spoke performances by dispersing the concentrated stress generated in the spoke receiving hole 19 to the notched flange 17 whose rigidity is low and by dispersing the stress by deflective elastic deformation of the body straight portion 13c attained by the lock of the spoke 13 with the spoke receiving hole 19. Still more, the hub 11 having the drum-like outer cylindrical portion disperses the force acting from the spoke 13 in the manner of the arch and has the high fatigue strength.

In combination of those features described above, it becomes possible to lighten the weight of the spoke wheel W1 further by thinning the rim, by reducing the number of spokes and by reducing the diameter of the spoke wires while keeping the high fatigue strength. Thus, it is possible to improve the performances of the spoke wheel.

Next, the spoke wheel to which the present invention is applied (referred to as a newly developed-type spoke wheel hereinafter) will be compared concretely with prior art iron rim-type and aluminum rim-type spoke wheels handled by the applicant, having the same level of fatigue strength and having the same specifications (16 inch in diameter of rim× 3.00 inch in width). The iron rim-type spoke wheel has the rim made of iron and is a tube tire-type spoke wheel in which spokes are anchored to a well portion of the rim through nipples. A number of spokes is 40. In the aluminum rim-type spoke wheel, the rim is made of an aluminum alloy mold material. Similarly to the iron rim-type spoke wheel, this is a tube tire-type spoke wheel in which spokes are anchored to a well portion of the rim through nipples and a number of spokes is 40.

When their weights were compared at first, the weight of the newly developed-type spoke wheel was 62.02% of the weight of the iron rim-type spoke wheel and was 68.10% of the weight of the aluminum rim-type spoke wheel. That is, the weight could be cut considerably by reducing the number of spokes while having the same level of fatigue strength.

Next, when their inertia were compared, the inertia of the newly developed-type spoke wheel was 46.32% of the inertia of the iron rim-type spoke wheel and was 52.90% of the inertia of the aluminum rim-type spoke wheel. It is thus possible to improve the performance of the spoke wheel such as running stability by reducing the inertia.

Figure 6A:
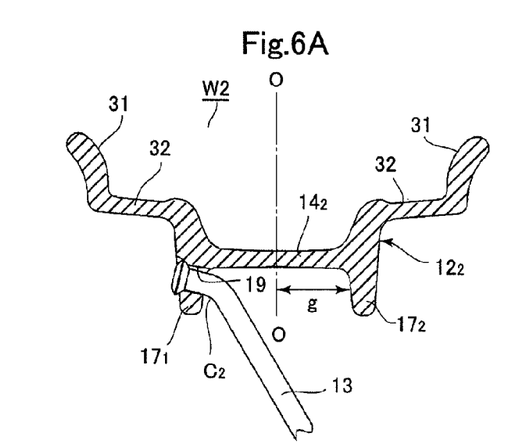
FIG. 6A is a section view illustrating a part of the rim to which the spoke is anchored according to another embodiment of the invention.
Figure 6B:
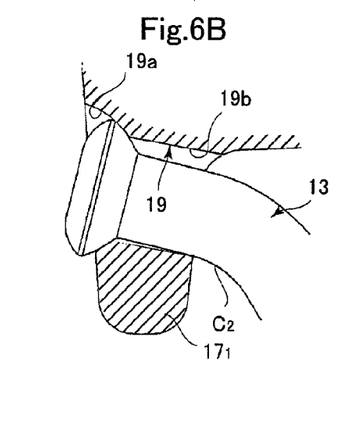
FIG. 6B is an enlarged view of a flange of the rim.
Figure 6C:
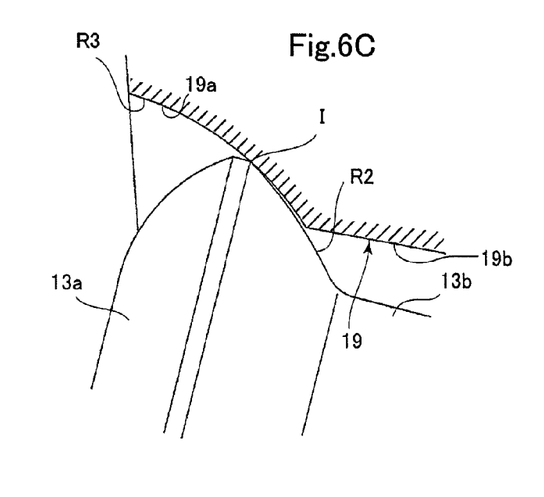
FIG. 6C is an enlarged view showing a part in FIG. 6B where the spoke contacts with the rim.

Next, another embodiment will be explained below with reference to FIGS. 6A through 6C. The present embodiment is different from the abovementioned embodiment only in the shape of the rim, so that parts of the present embodiment overlapping with those of the previous embodiment will be denoted by the same reference numerals in the figures and their explanation will be omitted here.

A rim $12_2$ of a spoke wheel W2 to which the present embodiment is applied comprises outer diametrical flange portions 31, bead seat portions 32, a well portion $14_2$ and two flanges $17_1$ and $17_2$. The rim $12_2$ is symmetrical centering on a widthwise center part of the well portion $14_2$. The left and right flanges $17_1$ and $17_2$ project toward the inner diameter direction from both end portions located with a predetermined distance in the width direction from the wheel center plane O-O of the well portion $14_2$. These flanges $17_1$ and $17_2$ are provided with spoke receiving holes 19. The spoke receiving hole 19 is perforated so as to incline by a predetermined angle in the inner diameter direction with respect to the line perpendicular to the wheel center plane O-O. A seat portion 19a having a large diameter is opened to a flange side surface on the outside in the axial direction. The spoke 13 is inserted from the seat portion 19a side and another end thereof is fastened to a hub (not shown) through a nipple.

Because the present embodiment is constructed as described above, a bending angle of a curved portion $C_2$ of the spoke 13 increases (in the direction approaching to 180°) and the curved portion $C_2$ is widened because the positions of the flanges $17_1$ and $17_2$ deviate in the widthwise direction by the predetermined distance g from the wheel center plane O-O. Accordingly, the deformation in the direction in which the spoke extends can be reduced further.

This application claims the benefit of Japanese Patent Application No. 2011-174884 filed on Aug. 10, 2011 which is hereby incorporated by reference herein in its entirety.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A spoke wheel comprising:
a hub;
a rim having a rim body and a flange projecting from said rim body at an inner diameter side of said rim, said flange having a first side surface and a second side surface and having a linear spoke receiving hole extending through said flange from said first side surface to said second side surface, said spoke receiving hole defined by an inner circumferential wall of said flange, said inner circumferential wall having a seating surface on said first side surface of said flange; and
a spoke connecting said hub with said rim, said spoke including:
a spoke-head formed at a first end of said spoke and engaging said seating surface such that said spoke extends through said spoke receiving hole of said flange;
a male screw portion formed at a second end of said spoke and fastened to said hub by a nipple;
a curved portion providing said spoke with a predetermined plane angle and an elevation angle with respect to said rim;
a head straight portion extending from said spoke-head to said curved portion; and
a body straight portion extending linearly from said curved portion to said male screw portion;
wherein a central longitudinal axis of said linear spoke receiving hole is inclined radially with respect to a line perpendicular to a center plane of said rim and towards said rim body in a direction from said second side surface toward said first side surface;
wherein said seating surface opens to said first side surface of said flange at a section of said inner circumferential wall of said spoke receiving hole closer to said rim body than any other section of said inner circumferential wall of said spoke receiving hole due to said inclination, said seating surface having a diameter larger than a diameter of said spoke receiving hole at said first flange surface; and
wherein said spoke-head is seated on and in contact with said seating surface at a region of said spoke-head closer to said rim body than any other region of said spoke-head, and said head straight portion penetrating through said spoke receiving hole contacts an edge portion of said inner circumferential wall of said spoke receiving hole at a section of said inner circumferential wall of said spoke receiving hole farther from said rim body than any other section of said inner circumferential wall of said spoke receiving hole at a location where said spoke receiving hole opens to said second side surface of said flange.

2. The spoke wheel according to claim 1, wherein said flange projects from said rim body in an inner diameter direction through an intermediary of a first curved surface; and
wherein said seating surface has a rim body side end, and said seating surface opens so that said rim body side end is located at a position forming a part of said first curved surface between said seating surface and said rim body on said first side surface of said flange.

3. The spoke wheel according to claim 1, wherein a portion of said spoke-head closer to said head straight portion than any other portion of said spoke-head is formed of a second curved surface;
wherein said seating surface is formed of a third curved surface; and
wherein a radial dimension of said second curved surface of said spoke-head is greater than a radial dimension of said third curved surface of said seating surface so that said second curved surface of said spoke-head contacts said third curved surface of said seating surface at an edge of said second curved surface of said spoke-head.

4. The spoke wheel according to claim 1, wherein said flange is annular and has cutaway portions at predetermined intervals around an entire circumference of said rim.

5. The spoke wheel according to claim 1, wherein said hub includes:

a left axle supporting portion and a right axle supporting portion spaced apart from each other by a predetermined distance;

a drum-like outer cylindrical portion having a center part bulging in a radial direction; and a plurality of ear portions formed on a left part and a right part of an outer circumferential surface of said outer cylindrical portion;

wherein said male screw portion of said spoke is fastened to one of said ear portions by said nipple; and wherein a substantially circular space is formed inside said outer cylindrical portion between said left axle supporting portion and said right axle supporting portion.

6. The spoke wheel according to claim 5, wherein each of said ear portions has a nipple receiving hole with an inner surface having a stepped portion receiving a nipple-head, and said nipple receiving hole having a hole portion through which a body portion of said nipple penetrates;

wherein a part of said stepped portion closer to said hole portion than any other part of said stepped portion has a fourth curved surface, a part of said nipple-head closer to said body portion than any other part of said stepped portion has a fifth curved surface, and a radial dimension of said fifth curved surface of said nipple-head is larger than a radial dimension of said fourth curved surface of said stepped portion; and wherein said fifth curved surface of said nipple-head contacts said fourth curved surface of said stepped portion, and a radial dimension of said hole portion is such that said hole portion does not contact a base portion of said body portion closer to said nipple-head than any other portion of said body portion.

7. The spoke wheel according to claim 1, wherein only one flange is formed at a widthwise center part of said rim.

8. The spoke wheel according to claim 1, wherein two flanges are formed, each of said flanges being spaced apart a predetermined distance from a widthwise center part of said rim.

* * * * *